(12) United States Patent
Barringer

(10) Patent No.: US 7,503,144 B2
(45) Date of Patent: Mar. 17, 2009

(54) PLANT CONTAINER HAVING A CONFORMABLE BASE AND A METHOD OF CONSTRUCTING THEREOF

(76) Inventor: Vernon Lynn Barringer, 26 Country Club Dr., Canyon, TX (US) 79015

(*) Notice: Subject to any disclaimer, the term of this patent is extended or adjusted under 35 U.S.C. 154(b) by 0 days.

(21) Appl. No.: 11/609,288

(22) Filed: Dec. 11, 2006

(65) Prior Publication Data

US 2007/0137102 A1 Jun. 21, 2007

Related U.S. Application Data

(60) Provisional application No. 60/749,250, filed on Dec. 9, 2005.

(51) Int. Cl.
*A01G 9/02* (2006.01)
*A47G 7/00* (2006.01)

(52) U.S. Cl. ............................... 47/65.7; 47/65.5; 47/39

(58) Field of Classification Search .................... 47/79, 47/75, 71, 65.7, 65.8
See application file for complete search history.

(56) References Cited

U.S. PATENT DOCUMENTS

| | | | |
|---|---|---|---|
| 3,129,710 A * | 4/1964 | Wickliff | 131/235.1 |
| 4,964,600 A * | 10/1990 | Lee | 248/146 |
| 5,644,867 A * | 7/1997 | Gay | 47/71 |
| 6,315,120 B1 * | 11/2001 | Tally et al. | 206/373 |
| 7,013,598 B2 | 3/2006 | Powless | |
| 7,020,997 B1 | 4/2006 | Thomas | |
| 7,143,543 B1 | 12/2006 | Daniell | |

* cited by examiner

*Primary Examiner*—Michael R Mansen
*Assistant Examiner*—Monica L Williams

(57) ABSTRACT

Containers for a plant and a method of constructing thereof. In one embodiment, the present invention provides a plant container includes (1) a pot and (2) a base, coupled to the pot, that is configured to (2A) conform to a surface where the container is placed and (2B) support the pot in a substantially upright position.

18 Claims, 2 Drawing Sheets

PLANT CONTAINER HAVING A CONFORMABLE BASE AND A METHOD OF CONSTRUCTING THEREOF

CROSS REFERENCE TO RELATED APPLICATIONS

The present application claims benefit of U.S. Provisional Application No. 60/749,250, filed on Dec. 9, 2005, by Vernon Lynn Barringer and entitled "CONFORMABLE PLANT POT."

TECHNICAL FIELD OF THE INVENTION

The present invention is directed, in general, to containers for plants and, more specifically, to a plant container having a conformal base for use on uneven surfaces such as in the crotch of a tree or bush.

BACKGROUND OF THE INVENTION

Pots for plants such as flowers, ivy, etc. have been available for decades. They generally are round in horizontal cross section, although some are square or have an even different shape.

Pots offer the gardener an opportunity to grow plants that they might otherwise be unable. Permanent pots enable the associated plants to be moved to locations having the best light, protection from extremes of weather, etc. Permanent pots are often unglazed clay because the clay is minimally water-permeable and quite inexpensive. Other permanent pots are often highly decorative and glazed to protect the decoration. The permanent pots almost universally have a central hole in the bottom of the pot to allow excess water to flow through so that a plant's roots are not continually standing in water.

Typically, the pots, such as clay pots, glazed or unglazed, are fragile and need to be on a substantial horizontal surface. Other permanent pots may be made from a variety of plastics and are reasonably durable, although not unbreakable. Permanent plastic pots also require placement on a substantial horizontal surface. Placement on sloping or uneven surfaces usually results in the pot and plant falling to an ignominious end.

Accordingly, what is needed in the art is a plant pot that can be placed on uneven surfaces without risk of falling.

SUMMARY OF THE INVENTION

To address the above-discussed deficiencies of the prior art, the present invention provides, containers for a plant and a method of constructing a container for a plant. In one aspect, the present invention provides a container for a plant including: (1) a pot and (2) a base, coupled to the pot, that is configured to (2A) conform to a surface where the container is placed and (2B) support the pot in a substantially upright position.

In another aspect, the present invention provides a method of constructing a container for a plant, including (1) placing a fill material within a sack and (2) fastening the sack to a plant pot.

In yet another aspect, the present invention provides a plant container, including: (1) a pot having (1A) a receptacle and (1B) a rigid bottom with at least one drainage hole and (2) a base, coupled to the pot at the receptacle, wherein the base is configured to (2A) conform to even and uneven surfaces and (2B) support the pot in a substantially upright position.

The foregoing has outlined preferred and alternative features of the present invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the present invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
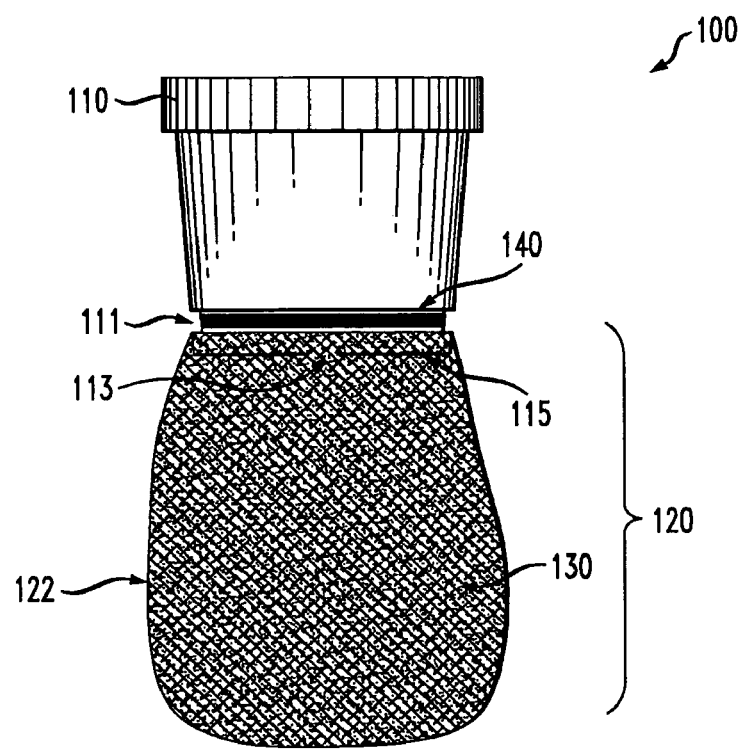
FIG. 1 illustrates an elevation view of one embodiment of a container for a plant constructed according to the principles of the present invention.

Referring initially to FIG. 1, illustrated is an elevation view of one embodiment of a container for a plant, generally designated a plant container 100, constructed according to the principles of the present invention. The plant container 100 includes a pot 110 and a base 120. The base 120 includes a flexible sack 122 having fill material 130. The base 120 is fastened to the pot employing a securing band 140.

The pot 110 is similar to a conventional plant pot. In other words, the pot 110 includes a rigid side or sides that form an opening and a rigid bottom (denoted by 115 in FIG. 1) that is configured to contain soil and a plant. In some embodiments, the pot 110 may be constructed of clay or plastic. In other embodiments, the pot 110 may be constructed of other materials, such as, wood or metal. The pot 110 is cylindrical in shape with tapered sides. However, the shape of the pot 110 may vary.

Unlike a conventional plant pot, the pot 110 includes a circumferential groove 111 proximate the rigid bottom 115. The circumferential groove 111 is a receptacle that is used to attach the base 120 to a lower portion of the pot 110. In other embodiments, the circumferential groove 111 may be located at other portions of the pot 110, such as, an upper or middle portion. In other embodiments, the receptacle may be different than the circumferential groove 111. For example, the receptacle may be a series of holes wherein the securing band 140 may be threaded to fasten the base 120 to the pot 110.

As noted above, the base 120 includes the flexible sack 122. The flexible sack 122 is configured to contain the fill material 130 and conform to multiple surfaces to provide support and stability for the pot 110. The flexible sack 122 may be constructed of a porous material to contain the fill material 130 and allow drainage from the pot 110 via the drainage hole 113. The flexible sack 122, for example, may be constructed of cloth or plastic. In some embodiments, the flexible sack 122 may be constructed of a net wherein the holes of the net are smaller than the fill material 130. As such, the flexible sack 122 may even be constructed of metal or other natural materials.

The fill material 130 may be a small, granular material with a substantial weight. In one embodiment, the fill material 130 may be pebbles, gravel or stones. The fill material 130 can be colorful rocks. Alternatively, the fill material 130 may comprise beads or lead/steel shot, such as common BBs or that used for hunting small game. The type and size of the fill material 130 would be chosen depending upon the need for stabilizing weight for a medium to large plant.

The securing band 140 may be formed from a twist tie, or may be incorporated in the neck of the flexible sack 122 as a drawstring that is tied to secure the flexible sack 122 to the pot 110. Alternatively, the securing band 140 may be a cable tie preferably made of plastic or stainless steel that would resist the effects of weather. One who is of skill in the art will understand how a cable tie may be employed to fasten the flexible sack 122 to the pot 110.

Figure 2A:
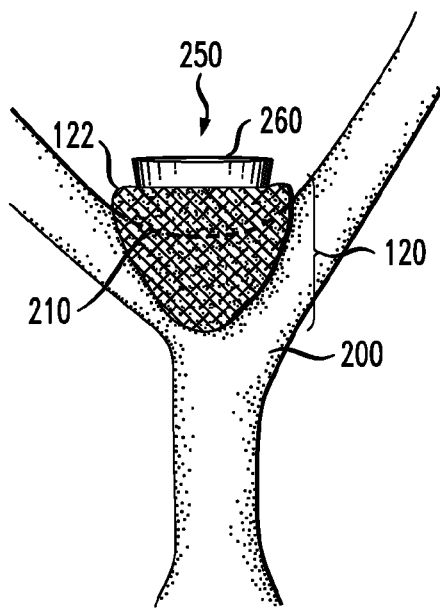
FIG. 2A illustrate a front view of an embodiment of a plant container constructed according to the principles of the present invention as the plant container may be used in a tree.
Figure 2B:
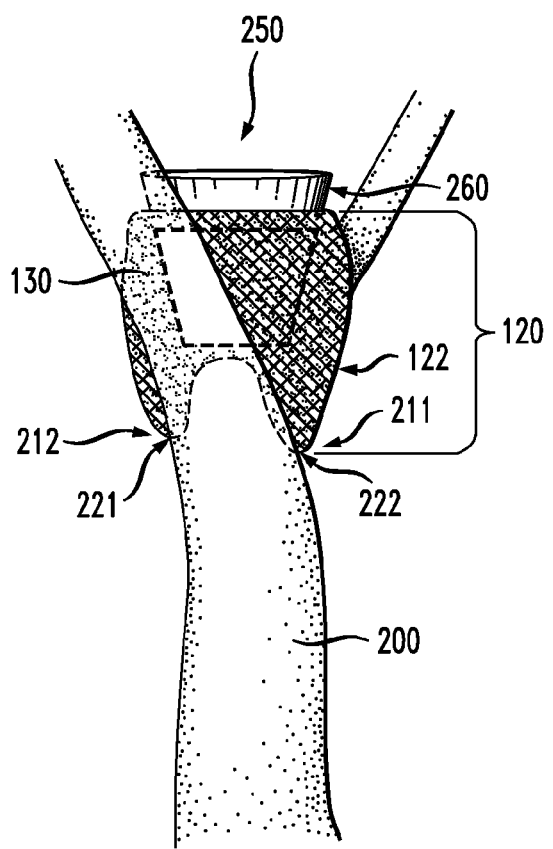
FIG. 2B illustrates a side view of the embodiment of the plant container of FIG. 2A as the plant container may be used in a tree.

Referring now to FIGS. 2A and 2B, illustrated are front and side views of a plant container 250 constructed according to the principles of the present invention. The plant container 250 includes components as discussed above with respect to the plant container 100 of FIG. 1. As such, the same designations will be used for these components. The receptacle of a pot, however, of the plant container 250 (which is also a circumferential groove), is located proximate a top of a pot instead of proximate a bottom of a pot. As such, a pot of the plant container 250 will be denoted as the pot 260.

As mentioned above, the flexible sack 122 may be constructed of a durable, porous cloth or flexible plastic material that allows excess water to drain from the pot 260, around the fill material 130 and through the flexible sack 122. The fill material 130 has sufficient weight to prevent the plant container 250 from falling over when placed on an uneven surface. Further, the combination of the flexible sack 122 and the fill material 130 enables the flexible sack 122 to conform to the uneven surface. Note that the flexible sack 122 has enough unfilled space therein that at least a portion of the flexible sack 122 will fall to each side 211, 212 of a crotch 210 in the tree 200 and the pot 260 will be securely surrounded by the fill material 130. This enables the pot 260 to remain stable in the crotch 210 as well as to carry water away from the tree crotch 210 at lowest points 221, 222 of the flexible sack 122.

Figure 3:
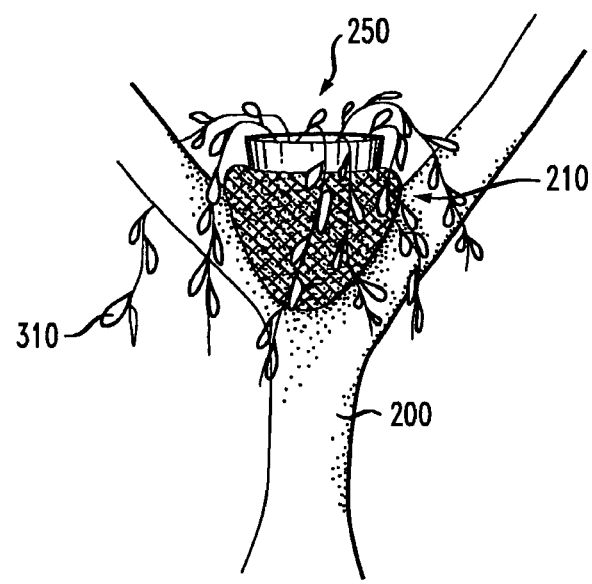
FIG. 3 illustrates a front view of an embodiment of the plant container of FIG. 2A as it might be employed to hold and grow an ivy in the branch of a tree.

Referring now to FIG. 3, illustrated is a front view of the plant container 250 of FIG. 2 as it might be employed to hold and grow ivy 310 in the crotch 210 of the tree 200. In this way, shade loving plants, especially those with bright, contrasting foliage to the tree, can be grown in the shade of the tree 200 yet not be attached to the tree 200, as a parasitical plant would. Of course, the plants to be grown in the plant container 250 are not limited to ivy, but are limited only by the environment present in the vicinity of the plant container 250.

Another benefit of the present invention is that potted plants may now be grown on an uneven surface without danger of the pot falling. Additionally, potted plants may now be grown away from animals, such as dogs, that tend to destroy plants that they can reach on the ground. Furthermore, plants may now be readily taken indoors to protect the plants from inclement weather. Additionally, one who is of skill in the art can readily envision applications other than the tree crotch that present an uneven surface where the conformable plant pot may be employed. For example, the plant container 250 may be positioned on a waterfall of a swimming pool. Furthermore, the conformal plant pot is not restricted to use in trees, but may also be used in bushes, etc.

The plant containers of the present invention may be sold fully assembled, or as a kit to be assembled by the end user. To construct a plant container according to the present invention, one may form a base by placing fill material in a sack and attaching the base, the sack with the fill material to a pot. In some embodiments, the pot will have a receptacle wherein the base can be fastened by a band.

In a kit to be assembled, fill material may be packaged within a flexible sack along with a securing band, all of which may be conveniently packaged inside of the pots. With the plant container packaged as a kit, the end user may adjust the amount of fill material to fit the specifics of their own application.

Although the present invention has been described in detail, those skilled in the art should understand that they can make various changes, substitutions and alterations herein without departing from the spirit and scope of the invention in its broadest form.

What is claimed is:

1. A container for a plant, comprising:
    a pot having at least one drainage hole in a bottom thereof; and
    a base, coupled to said pot, configured to conform to multiple uneven surfaces where said container is placed and support said pot in a substantially upright position on said multiple uneven surfaces, said base including a flexible sack constructed of a net, having a fill material and configured to allow drainage via said drainage hole.

2. The container as recited in claim 1 wherein said pot includes a receptacle for coupling said base to said pot.

3. The container as recited in claim 2 wherein said receptacle is a circumferential groove.

4. The container as recited in claim 3 wherein said circumferential groove is proximate a lower portion of said pot.

5. The container as recited in claim 1 wherein said pot is constructed of a material selected from the group consisting of:
    clay,
    wood, and
    plastic.

6. The container as recited in claim 1 wherein said fill material allows said drainage from said pot.

7. The container as recited in claim 6 wherein said fill material is selected from a group consisting of:
    pebbles,
    gravel,
    stones,
    beads, and
    metals balls.

8. The container as recited in claim 1 wherein said net is constructed of a material selected from the group consisting of:
    cloth,
    metal, and
    plastic.

9. The container as recited in claim 1 wherein a band is employed to couple said base to said pot.

10. The container as recited in claim 9 wherein said band is constructed of a material selected from the group consisting of:
    plastic, and
    metal.

11. The container as recited in claim 9 wherein said band is incorporated within a portion of said base.

12. A method of constructing a container for a plant, comprising:

placing a fill material within a sack constructed of a net;

fastening said sack with said fill material to a plant pot having at least one drainage hole in a bottom thereof, said sack of said fill material allowing drainage via said drainage hole when fastened to said plant pot.

13. The method as recited in claim 12 further comprising providing said plant pot having a receptacle for fastening said sack to said plant pot.

14. The method as recited in claim 13 wherein said fastening includes securing a band around a portion of said sack at said receptacle.

15. The method as recited in claim 14 wherein said receptacle is a circumferential groove.

16. A container for a plant, comprising:

a pot having a receptacle and a rigid bottom with at least one drainage hole; and a base, coupled to said pot at said receptacle, said base configured to conform to even and uneven surfaces and support said pot in a substantially upright position, said base including a sack containing a fill material that conforms to said even and uneven surfaces, said sack constructed of a net and configured to allow drainage via said drainage hole.

17. The container as recited in claim 16 wherein said receptacle is a circumferential groove proximate said rigid bottom.

18. The container as recited in claim 17 wherein said base is coupled to said pot at said circumferential groove by a band.

\* \* \* \* \*